INVENTOR.
BERNHARD F. TELLKAMP
BY
ATTORNEY.

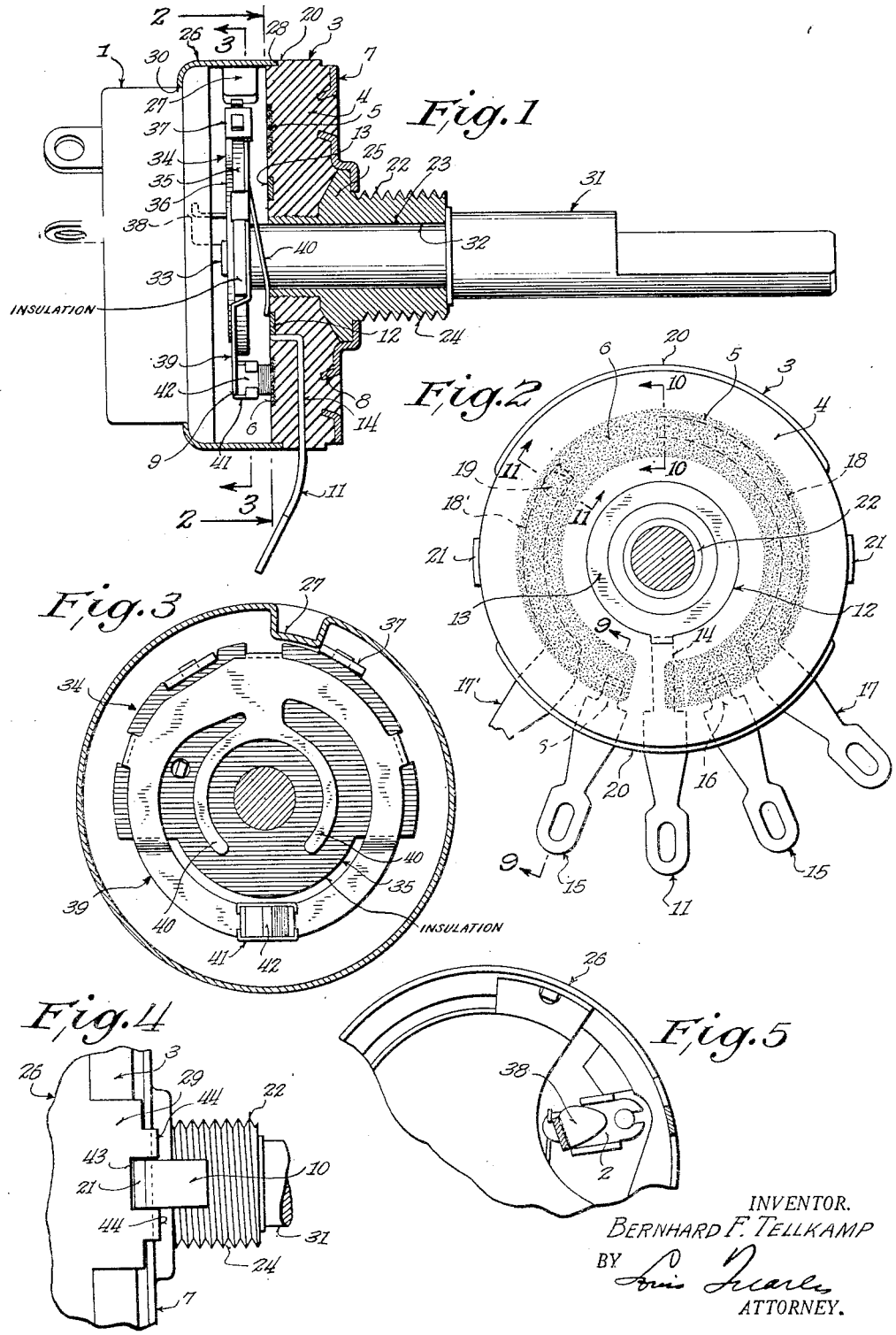

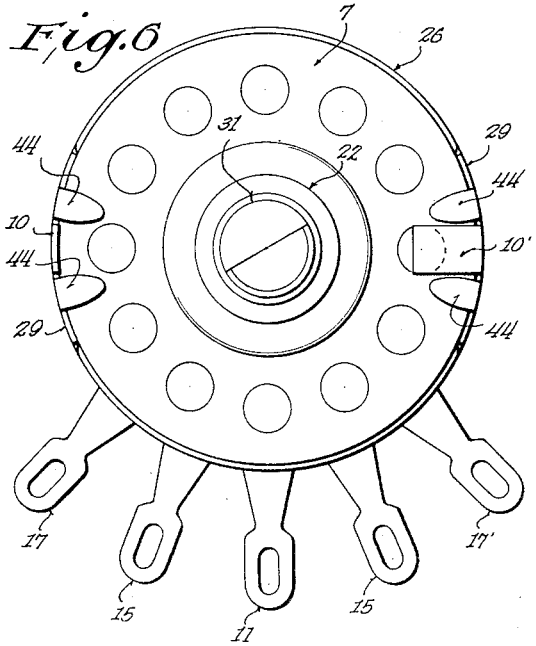
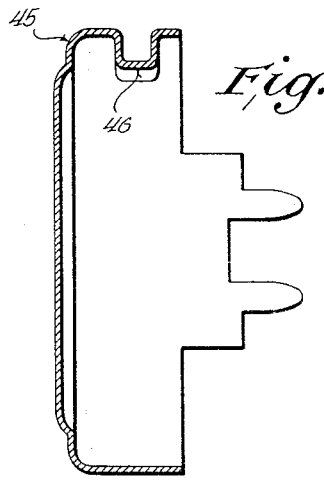
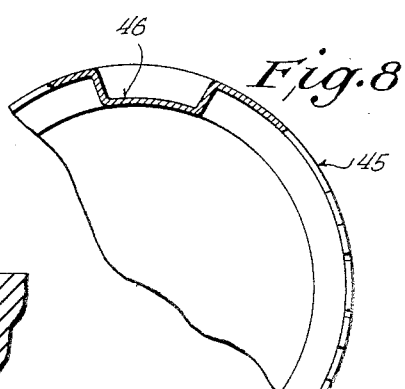
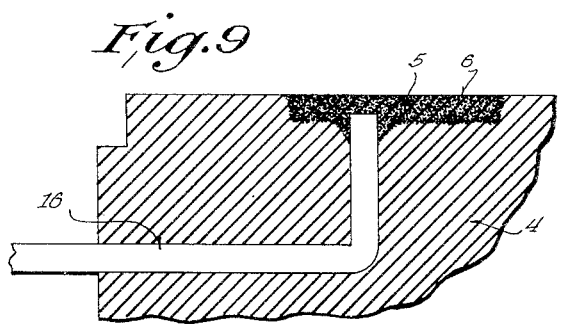
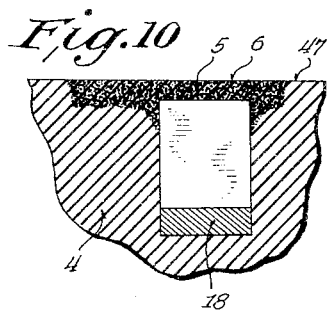
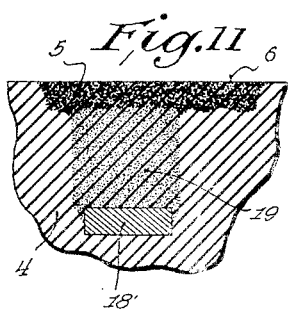
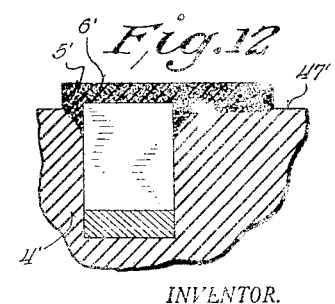

Jan. 6, 1942.                B. F. TELLKAMP                2,269,136
            RESISTANCE DEVICE AND PROCESS FOR MAKING SAME
                     Filed March 1, 1939          6 Sheets-Sheet 4
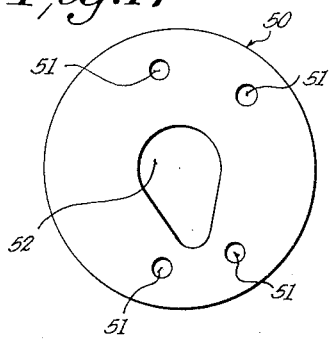
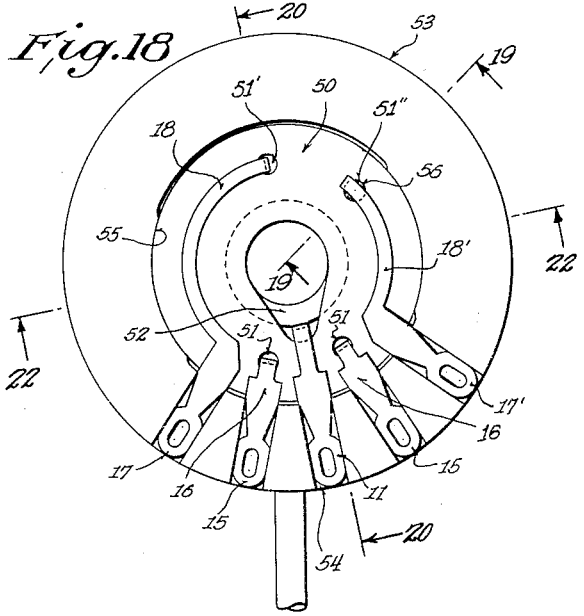
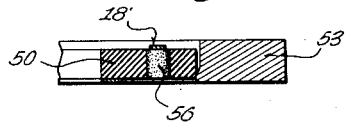
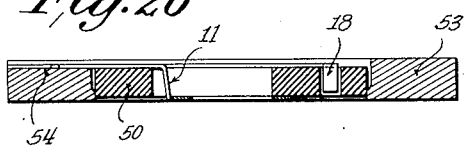
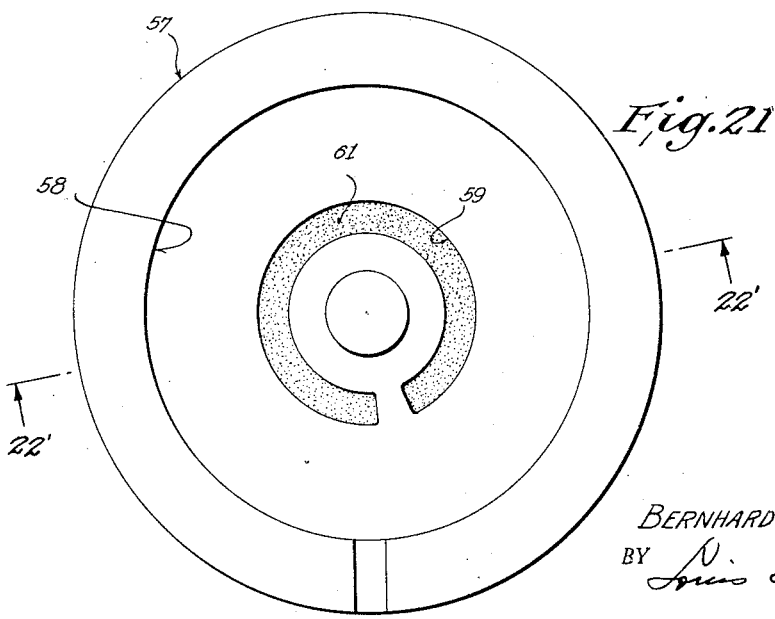
INVENTOR.
BERNHARD F. TELLKAMP
BY
ATTORNEY.

Jan. 6, 1942.   B. F. TELLKAMP   2,269,136
RESISTANCE DEVICE AND PROCESS FOR MAKING SAME
Filed March 1, 1939   6 Sheets-Sheet 5
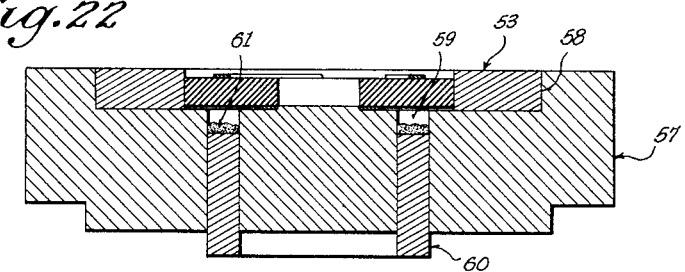
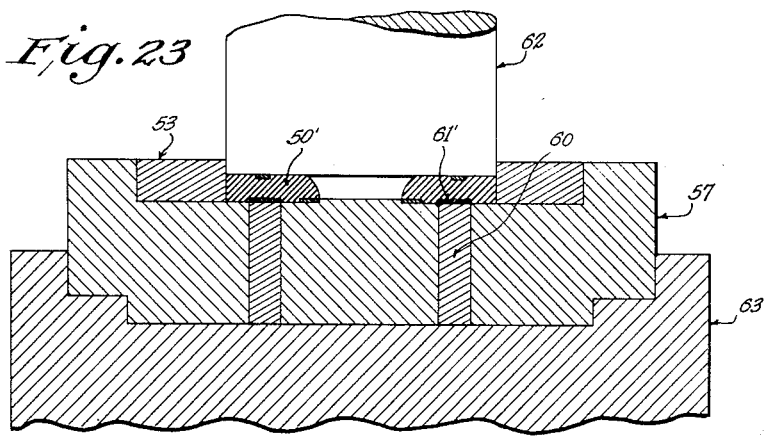
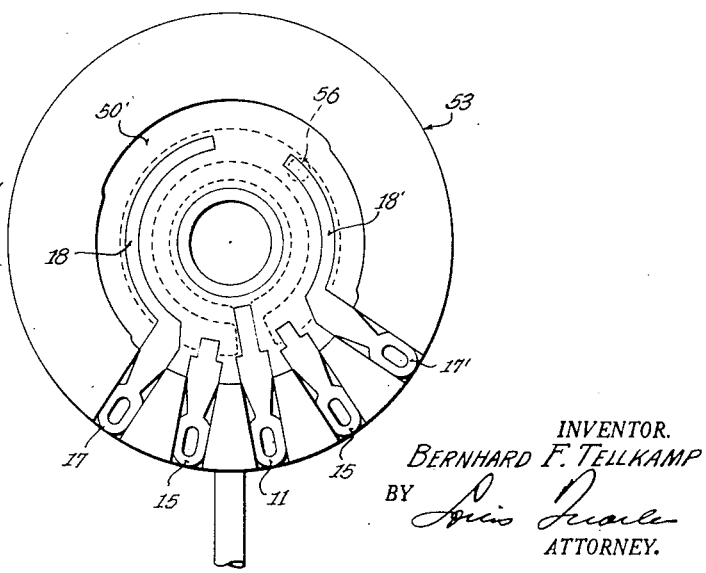
INVENTOR.
BERNHARD F. TELLKAMP
BY
ATTORNEY.

Jan. 6, 1942. B. F. TELLKAMP 2,269,136
RESISTANCE DEVICE AND PROCESS FOR MAKING SAME
Filed March 1, 1939 6 Sheets-Sheet 6
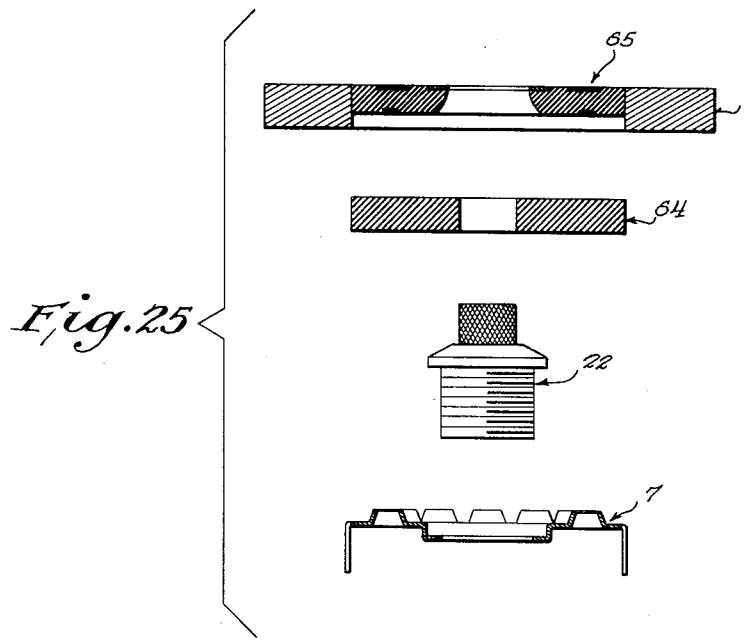
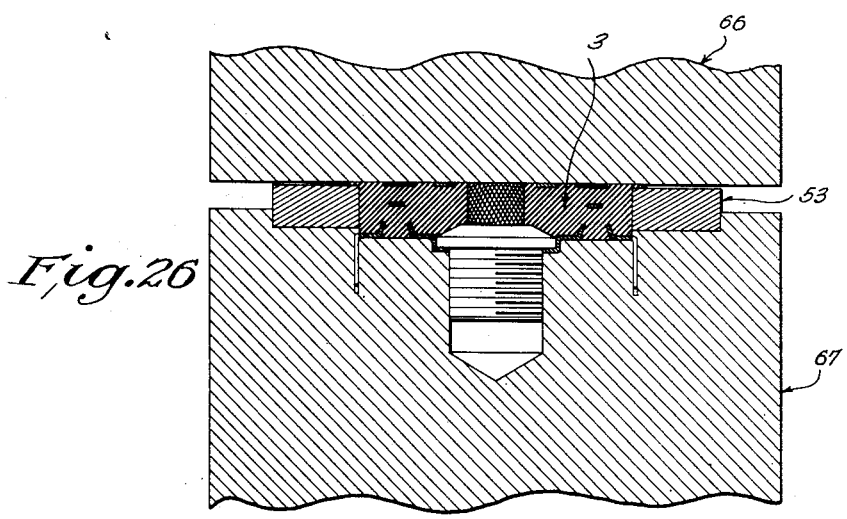
INVENTOR.
BERNHARD F. TELLKAMP
BY
ATTORNEY.

Patented Jan. 6, 1942

2,269,136

UNITED STATES PATENT OFFICE 2,269,136

RESISTANCE DEVICE AND PROCESS FOR MAKING SAME

Bernhard F. Tellkamp, Whitefish Bay, Wis., assignor to Allen-Bradley Company, Milwaukee, Wis., a corporation of Wisconsin Application March 1, 1939, Serial No. 259,216

16 Claims. (Cl. 201—63)

This invention relates to improvements in resistance devices, such as rheostats, potentiometers, and fixed resistor elements for special applications. Resistance devices of the type disclosed in this specification are principally used in communication circuits as variable resistors, such as volume controls and tone controls, and also as fixed resistors. They are well adapted for such uses, especially where power dissipation is substantial or applied voltage high. The devices of this invention are further specially adaptable to modifications in which fixed resistor elements are used in combination with a variable resistance device, a combination particularly advantageous in certain circuit arrangements.

One object of this invention is the obtainment of a resistance device wherein the molded resistor element is united in an integral structure with a molded insulating base.

A further object of this invention is the obtainment of a molded resistor element embedded in a molded insulating base containing associated parts, such as terminals, contacting device, separate fixed resistor, mechanical stops, mounting means, and power dissipating means.

A still further object is to provide in a unitary structure a novel molded resistor element utilizable both as a fixed and a variable resistor. Numerous novel constructional forms are possible within the scope of this invention and there may be produced in accordance therewith resistor devices of improved quality at a saving in cost of manufacture.

A still further object of this invention is to provide a resistance device of comparatively small size and of superior mechanical qualities.

A particular object of this invention is to arrange and support the various component parts by molding the same in place in the insulating base, which eliminates numerous parts as used in rheostats heretofore manufactured.

A further particular object of this invention is to provide a resistance element which may be formed in a base simultaneously with the formation of the base, producing a thoroughly united integral structure.

The invention herein disclosed also consists of a novel method of forming a resistance device possessing many advantageous characteristics.

A large share, perhaps nearly all of the commercial variable control devices now in use in the radio receiver industry, other than the devices of this invention, utilize a resistor element comprising a printed or sprayed layer of conducting paint on a layer of paper or other base material mounted in a suitable manner with separately attached terminals and other necessary component parts. However, such devices all lack stability of resistance with time and the resistance thereof also changes with changes in temperature and moisture, which behavior is not desirable for satisfactory performance of radio receivers.

There are also numerous electro-mechanical deficiencies in resistance units of this type, such as faulty or expensive terminal attachment, ineffective or inaccurate attachment of intermediate fixed tap positions, terminals interfering with substantially full rotation of the control contact, and poor resistance to mechanical wear of the resistor track with the variable contact device.

Because of the economies effected and the increased stability in resistance as regards change in time, temperature and moisture of the device of this invention, this invention represents a distinct step forward in the art. These features and other advantages of this invention will be apparent from the description following and from the attached drawings forming a part hereof and in which:

Fig. 1 shows a partially sectionalized view of one form of variable resistance device of this invention with an attached line switch;

Fig. 2 shows a view of the molded variable resistor element with the cover removed, viewed from the variable contact face at the plane 2—2 of Fig. 1;

Fig. 3 shows a view of the rotating contact mechanism, mechanical stop, and switch-operating lever, taken at the plane 3—3 of Fig. 1;

Fig. 4 shows a detail view of the means for locating and attaching the cover to the molded variable resistor element;

Fig. 5 is a detailed view showing the means by which the line switch is actuated;

Fig. 6 is an end view of the variable resistance device shown in Fig. 1;

Figs. 7 and 8 are sectional views of a modified form of cover used on a variable resistance device without line switch, showing the integrally formed stop and attaching lugs;

Fig. 9 is a sectional view showing the embedment of the terminal and resistor element in the molded insulating base taken at the plane 9—9 in Fig 2;

Fig. 10 is a sectional view showing the embedment of the terminal and resistor element in the molded insulating base taken at the plane 10—10 in Fig. 2;

Fig. 11 is a sectional view showing the embedment of the terminal, resistor element, and series resistor, in the molded insulating base, taken at the plane 11—11 in Fig. 2;

Fig. 12 is a sectional view of a modified form of the structure shown in Fig. 10;

Fig. 17 shows a preform of moldable insulation powder which may be used in making a resistor element in accordance with this invention;

Fig. 18 shows a sub assembly of parts prior to the cold pressing operation, from which resistor elements shown in Figs. 1 and 2 may be made;

Fig. 19 is a detail in section showing the sub assembly of parts at the plane 19—19 in Fig. 18;

Fig. 20 is a detail in section showing the sub assembly of parts at the plane 20—20 in Fig. 18;

Fig. 21 shows a die structure with moldable resistor powder in place, suitable for use in uniting and prior to cold pressing of the sub assembly of parts shown in Fig. 18;

Fig. 22 shows composite sectional views taken at the plane 22—22 in Figs. 18 and 21;

Fig. 23 shows the cold pressing of the sub assembly shown in Fig. 22;

Fig. 24 shows the sub assembly of parts after cold pressing;

Fig. 25 shows an exploded view of the parts used in hot pressing the variable resistor element; and Fig. 26 shows in section the hot molding of the variable resistor element.

Figure 13:
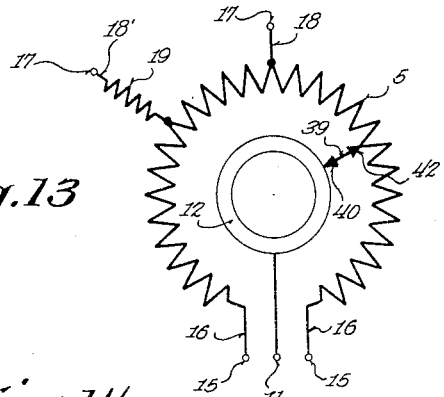
Fig. 13 shows schematically the circuit arrangement of the variable resistance device shown in Figs. 1 and 2.

Referring to the drawings, specific forms of the apparatus and parts of the apparatus of this invention are set forth as illustrative thereof and as illustrative of the steps constituting the method of this invention, the same being by way of instances in aid of the description only and not by way of limitation.

Figs. 1 and 2 show a molded base 3 including molded insulation 4, resistor element 5, reenforcing plate 7, center terminal 11, end terminals 15, 15, tap terminals 17, 17', series resistor 19, and bushing 22.

A metal cover 26 having an edge 28 fits against projecting portion 20 of the insulation portion 4. An indentation 27 in the cover 26 forms a stop for the rotating element 34, as shown in Fig. 3. Into the opening 30 in the back of the cover 26 is fitted line switch 1, as shown in Fig. 1. A metal shaft 31 having a bearing surface 32 fits within bearing 23 of bushing 22 and an integral rivet 33 attaches the rotating element 34 to the shaft 31.

A metal plate 36 is rigidly connected to shaft 31 by means of rivet 33 and has a bent projecting portion 37 that serves as a stop as it engages the stop 27 limiting the clockwise or counter-clockwise rotation of the rotating element 34. Another bent projecting portion 38 serves as a switch-operating lever. A spring contact member 39 is insulated from the metal piece 36 by means of insulating member 35, best shown in Fig. 3.

The contact member 39 has collector prongs 40, 40 which make a sliding contact with the face 13 of collector ring 12, and a contact button carrying member 41 with contact button 42 secured therein making sliding contact with the resistor element 5 on the resistor element contact face 6.

The contact button 42 is cemented in receptacle 41 by means of a resilient conducting cement 9. This cement is made from a resilient rubber and graphite properly prepared for this purpose. By using a conducting resilient material of this type as an intermediate contact between the contact button 42 and the metal receptacle 41, objectionable noises arising from the operation of the variable resistance device are obviated.

An instance of a resilient conducting cement that has proven to be satisfactory for this purpose may be made in accordance with the following formula:

| | Grams |
|---|---|
| Dispersed rubber adhesive (for example Dutch brand "Metl-Stik" cement) | 64 |
| Finely ground graphite (for example Dixon's 0611 graphite) | 45 |
| Naphthalene crystals | 5 |
| Xylol | 25 |

This cement can be best prepared by dissolving the naphthalene crystals in the xylol and then mixing in the remaining ingredients.

Fig. 2 is a view of the molded variable resistor element 3 viewed from the contact face 6 of the resistor element 5 through the plane 2—2 of Fig. 1. This view shows additional features of the molded variable resistor element 3 not shown in Fig. 1. The resistor element 5 embedded in the face of insulation portion 4 is an open ring with end terminals 15, 15 electrically connected to the end portions of the resistor element 5 by means of the end terminal connectors 16, 16. Two tap terminals, 17, 17' are arranged to make electrical contact with resistor element 5 at any desired point by means of the tap terminal connectors 18, 18'.

The tap terminal connector 18' makes electrical contact with resistor element 5 through resistor 19, shown in detail in Fig. 11. Bushing 22, collector ring 12, and resistor element 5 are all arranged concentrically with the insulation portion 4. Insulation portion 4 has an its periphery projecting portions 20, 20 and 21, 21 for properly locating metal cover 26, as shown in Fig. 1.

Fig. 3 shows the engagement of projection 37 of metal plate 36, shown in Fig. 1, with stop 27, limiting the counter-clockwise rotation of shaft 31.

Figs. 4 and 6 show the means by which the metal cover 26 is located and attached to the molded base 3. Cover 26 has two projecting portions 29, one on each of the opposite sides of the metal cover that have formed therein a slot 43 and two prongs 44, 44. In attaching the cover 26, the slot 43 engages the locating projection 21 of the molded base and a metal locating lug 10 of the reenforcing plate 7, as shown more clearly in Fig. 6 and described in more detail below, thus determining the angular location of cover 26 with respect to the molded base 3. The metal prongs 44, 44 are then bent over on the reenforcing plate 7 to lock the cover 26 securely in place.

Fig. 5 is a detail view showing the way in which the nose-like cam end of the switch operating lever 38 engages the switch lever 2. The nose of lever 38 enters and leaves the open end portion of lever 2 as the rotating element 34 is turned and lever 38 thereby moves lever 2 to operate the switch.

Fig. 6 is a view of the variable resistance device viewed from the shaft end. This view shows the cover 26 attached to the molded base 3 by means of prongs 44, 44, 44, 44. It also shows a locating lug 10' which may be bent over against reenforcing plate 7, as shown. The other locating lug 10 is shown at right angles to plate 7, in which position it may be used as a means for locating and locking the device when it is mounted upon a panel, bracket, or other suitable structure. Either or both of lugs 10, 10' can be used for this purpose and may be bent, as in the case of 10', or not, as desired.

Figs. 7 and 8 show two views of a metal cover 45 with integrally formed stop 46. This cover serves the same purpose as cover 26 except that it is modified so as to fit a variable resistance device without an attached line switch. In the form shown, the angular span of stop 46 is increased sufficiently to compensate for the angular movement necessary to operate the absent line switch.

By means of this alteration it is possible to use the same form of molded variable resistor element 3 in devices with or without the attached line switch without any other changes being required.

Figs. 9, 10, and 11 are sectional views showing the embedment of the resistor element 5 in the insulating base 4. The terminal connectors 16, 18, and 18' are rigidly held by the insulating base material 4 so that stable contact conditions are maintained between the connectors 16, 18 and 18' and the molded resistor element 5, or the series resistor 19. The embedment of the connectors 16, 18 and 18' provide a rigid support for their corresponding terminals 15, 17 and 17', as shown in Fig. 2. It is to be noted that the insulation also provides definite clearance between the terminals and connectors and also anchors the projecting tangs 8 of the reenforcing plate 7, as shown in Fig. 1. It is also possible to mold in place in insulating portion 4 a blank or "dummy terminal" that does not make direct connection with the resistance element, but merely serves as an insulated stand-off for connecting other components, such as fixed resistors, capacitors, etc.

In the preferred form shown, applicant has found that it is more practical to mold the variable resistor element so that the exposed contact face 6 lies in the same plane as the surface 47 of base 4, shown in Fig. 10. A modified form of this invention, having special advantages under certain conditions, is shown in Fig. 12, where the exposed contact face 6' and surface 47' are not in exactly the same plane. In the latter case it is immaterial whether or not the main portion of the integral bond between conductor and insulating base is above or below the surface of the insulating base.

A schematic showing of the effective circuit of the component parts of the form of control device set forth in Fig. 1 and in further detail in Fig. 2, is shown in Fig. 13. Resistor element 5 is in the form of a ring, with arrangements for variable contact with center terminal 11 by means of contact button 42, spring contact member 39, collector prong 40 and collector ring 12. The resistor element 5 may have its total resistance distributed uniformly or non-uniformly throughout its length. Two intermediate tap positions are shown. Terminal 17 is connected by means of connector 18 to any desired fixed point on resistor element 5. Terminal 17' is connected by means of connector 18' to series resistor 19, which in turn is connected at any desired fixed point on resistor element 5. End terminals 15, 15 are connected by means of connectors 16, 16 to the electrical ends of resistor element 5. It will be obvious to one skilled in this art that controls of different types can be obtained from this structure. Rheostats, potentiometers, and modifications of either form, can easily be obtained through application of the electro-mechanical principles of this invention by varying the selection and arrangement of the components shown herein.

The variable resistance device of this invention has far superior power dissipating characteristics compared to the available commercial controls of this type. When this device is mounted to a metal plate or bracket there is provided a continuous path of metal from the reenforcing plate 7 to the mounting plate or bracket for the conduction of heat. The intimate thermal contact between the reenforcing plate 7 by means of the embedded tangs 8 in the insulating base 4 provides for good thermal conduction from the resistor element 5 to the mounting means and accordingly increases the load rating.

Figure 14:
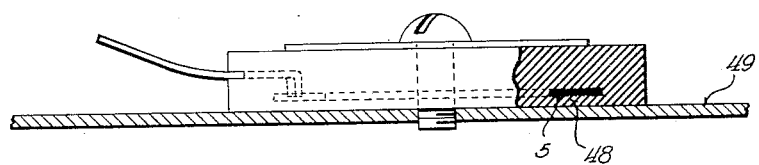
Fig. 14 shows a modified form of the resistor element of this invention employed as a fixed resistor.
Figure 16:
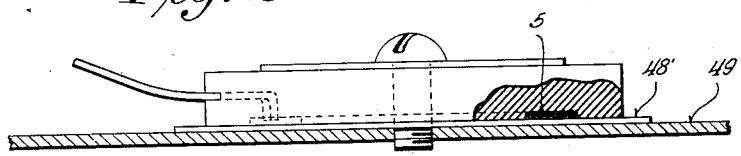
Fig. 16 shows another modified form of the resistor element of this invention employed as a fixed resistor.

The molded resistor element shown in Fig. 2 has been used as a fixed resistor having excellent power dissipating characteristics when mounted by means of the attached bushing 22. Two modified forms of this invention are shown in Figs. 14 and 16, in which the reenforcing plate, bushing and unnecessary terminals have been omitted. Fig. 14 shows a form in which a thin layer of insulating material 48 is molded over the resistor element 5. Fig. 16 shows a form in which a thin insulating washer 48' is placed between the molded resistor element 5 and the mounting plate 49. Either of the two forms shown lend themselves to the same manufacturing technique used in molding the variable resistor element 3.

Figure 15:
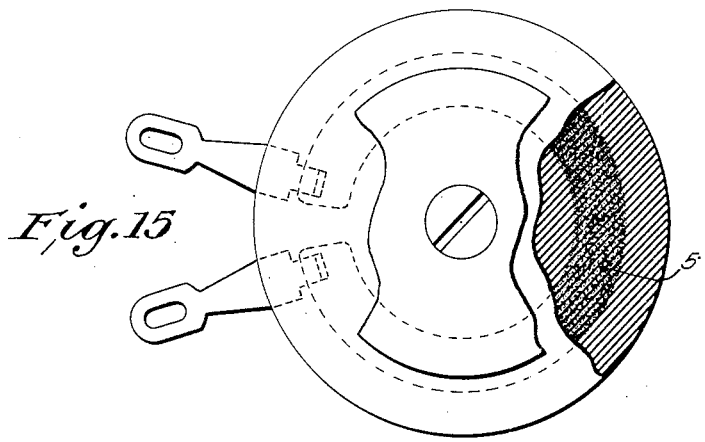
Fig. 15 is a top view of Fig. 14.

Fig. 15 is a plan view of Fig. 14 in which the mounting plate has been omitted. The partial sectional views and the parts shown in broken lines in Figs. 14, 15, and 16, show clearly the arrangement and construction of the various parts and the similarity that exists between the two modified forms and the preferred form shown in Fig. 2.

In molding the variable resistance element, a preform 50 of moldable insulating powder, as shown in Fig. 17, is pressed into the opening 55 of ring-die 53 shown in Fig. 18. The center terminal 11 is slipped through the opening 52 in preform 50 and into the groove 54 in ring-die 53. The end terminals 15, 15 are placed into like grooves in ring-die 53 with the connectors 16, 16 over-hanging preform 50 with the connectors 16, 16 projecting into the holes 51, 51 in preform 50. Tap terminals 17, 17' are placed into the grooves, as shown in the ring-die 53, with the connectors 18, 18' overhanging preform 50, with connector 18 projecting into the hole 51' in preform 50, and connector 18' overlying the hole 51" into which has been inserted a preform of moldable resistor material 56. Details of this sub-assembly of parts are shown in Figs. 19 and 20, in which Fig. 19 is a view of section taken on plane 19, 19 of Fig. 18 and Fig. 20 is a view of section taken on plane 20, 20 of Fig. 18.

The moldable resistor powder 61 used to form the resistance element 5, shown in Figs. 1 and 2, is loaded into the plunger-backed horseshoe-shaped opening 59 of a cold pressing die 57 which is dimensioned to receive die 53, as shown in Figs. 21 and 22. Fig. 22 is an assembled view of sections taken on planes 22, 22 and 22', 22' of Figs. 18 and 21, respectively. The sub-assembly of parts shown in Fig. 18 is then placed in the recess 58 of cold pressing die 57, as shown in Fig. 22. In this position the components are so located that by direct cold pressing they can be formed into a semi-solid having a convenient form for subsequent handling. The completion of the cold pressing is shown in Fig. 23, where the cold pressing die 57 is supported by base 63 and pressure applied to punch 62 causing the horseshoe-shaped punch 60 to rise and embed the moldable resistor powder 61' in the preform 50' and in contact with the connectors 16, 16 and 18 and series resistor preform 56, shown in Fig. 18. Fig. 24 shows the ring die 53 with the component parts after cold pressing.

The final molding operation of the base element 3 is shown in Figs. 25 and 26. Fig. 25 is an exploded view of the component parts that go together to form the base element 3. In this view there is also shown the ring die 53 in which the cold molded blank 65 is carried, but this, of course, is later removed. The parts are: the cold pressed assembly of parts 65, being a sectional view of the part shown in Fig. 24, a preform of moldable insulation material 64, a bushing 22, and reenforcing plate 7. Die block 67, shown in Fig. 26, is maintained at a constant and suitable molding temperature of from 300 to 500 degrees F.; in one instance 425 degrees F. has been found preferable. The parts shown in Fig. 25 are stacked in the order shown and after suitable preheating, molding pressure is applied by means of the upper platen 66, which is also maintained at a suitable molding temperature, forming the variable resistor element 3, as shown in Fig. 26.

At suitable molding temperatures, as detailed above, and with pressure applied, a flowage of insulation material 64 and the resistor element 65 takes place whereby in the finished resistor an integral structure is formed; that is, the resistor element and the insulation material and other parts are autogenously united at their interfaces.

For this reason the term "integral" is used herein to mean an adherent and intimately bonded assembly in contradistinction with an assembly united by pressed fits, crimping of parts, friction, or the like.

The various dies, punches, and fixtures shown and described above are detailed to assist in showing the essential features of the process. It will be apparent to one skilled in the art of die construction and molding technique, that certain refinements and variations consistent herewith may be desirable in the operation of the process disclosed.

In constructing the preferred form of the base element of this invention, the following materials may be used as examples:

*Insulation material*

Phenol-aldehyde resin
 (such as #175 Durez resin) _____lbs.___ 6.6
Ground quartz _____lbs.___ 22.2
Cadmium red _____lbs.___ 1.2
Lubricant _____gms.___ 70

*Resistance material—low resistance*

Phenol-aldehyde resin
 (such as #175 Durez resin) _____lbs.___ 12.0
Calcined carbon black _____lbs.___ 18.0
Lubricant _____gms.___ 136

*Resistance material—range of values*

Phenol-aldehyde resin
 (such as #175 Durez resin) lbs.___ 7.5
Calcined carbon black _____lbs.___ 3 to 7
Ground quartz _____lbs.___ 15.5 to 19.5
Lubricant _____gms.___ 136

The ingredients are mixed and worked on a hot roll until preliminary polymerization produces proper flow characteristics. After the roll treatment the material is cooled, crushed, and ground, to pass a 40 mesh screen. A suitable range of resistance compounds may be made by varying proportions of ingredients so that it will be possible to obtain any desired resistance or distribution of resistance.

The resistance materials are loaded into the horse-shoe-shaped opening 59 of cold pressing die 57 by means of a loading device capable of suitably measuring and placing the materials in the die in the proper order. The series resistor may be made by preparing from the proper resistance material a preform 56 suitable for insertion in the hole 51 of preform 50.

Inasmuch as many changes may be made in the above constructions and many apparently widely different embodiments of this invention may be resorted to without departing from the principles thereof, as defined by the following claims, it is intended that all matter contained in the above description or shown in the accompanying drawings shall be interpreted as illustrative and not in a limiting sense.

What I claim as my invention is:

1. In a resistance device, a molded base, a molded resistor element secured at its lower side to said base, and a one-piece continuous metallic terminal having a portion partly embedded in said base and partly exposed on the exterior of said base and a second portion of said continuous metallic terminal at an angle with said first portion embedded in said base with the end thereof in electrical contact with the lower side of said resistor element.

2. In a resistance device, a molded base, a molded resistor element secured at its lower side to said base as an integral part thereof, and a one-piece continuous metallic terminal having a portion partly embedded in said base and partly exposed on the exterior of said base and a second portion of said continuous metallic terminal at an angle with said first portion embedded in said base with the end thereof in electrical contact with the lower side of said resistor element.

3. In a resistance device, a molded resistor element, a molded base, and a terminal, said resistor being substantially an open ring joined at its lower side to said base to form therewith an integral part thereof, said terminal being in the form of a single continuous piece of metal having a radially emerging portion embedded in said base displaced axially a substantial distance from said resistor, and an axially extending portion at its inner end extending into electrical contact with the lower side of said resistor.

4. In a resistance device, a molded resistor element, a molded base, and a terminal, said resistor being supported by said base with the lower side of said resistor in contact therewith, said terminal being in the form of a single continuous piece of metal having an emerging portion embedded in said base, a laterally-extending embedded portion in said base, both being displaced vertically a substantial distance from said resistor, and a vertically-extending portion at the inner end of said terminal, the end of said vertically extending portion being in electrical contact with the lower side of said resistor.

5. In a resistance device, a molded resistor element, a molded base of insulation for support of said resistor element, a bushing for mounting said base having a circumferential boss intermediate its ends, one end of said bushing being embedded in said base, said boss being in contact with said base with a portion of said bushing extending outwardly therefrom, and a metal plate having attachment means and an opening for accommodation of said outwardly-extending portion of said bushing, said plate being bonded to said base to reenforce the same by engagement of said attachment means therewith, said boss of said bushing being interposed between said plate and said base to secure said bushing to said base.

6. In a resistance device, a base of molded insulation, a molded resistor element integrally bonded to said base with an exposed contact surface for a variable contact, a cavity in said base communicating with said resistor element intermediate its ends, and a second molded resistor disposed in said cavity integrally bonded to said base, said first and second resistor elements being integrally bonded to one another, terminals at the ends of said first-named resistor element, a variable contact, and means for moving the same over the contact surface of said first-named resistor, and a terminal in contact with said second-named resistor for making a resisting branch connection with said first-named resistor.

7. In a variable resistance device, a resistor element having a face available for variable contact, a contact member, actuating means for moving said contact member with respect to and in contact with said face, said contact member being cemented to and held in place on said actuating means by a resilient conducting cement.

8. The method of forming a resistance element including a supporting insulating base and terminals, which comprises, first, cold forming a weakly solid upper blank of nonconducting thermal-setting molding material, next, cold embedding into a localized area of the upper face of said blank a thermal-setting resistor composition containing a thermal-setting binder and at the same time applying a metallic terminal to the reverse side of said blank, one end of which terminal pierces said blank to electrically engage said resistor composition and the other end of which projects beyond the margin of said blank, next, placing a second cold formed blank of nonconducting thermal-setting molding material against the reverse side of said first-mentioned blank, and then applying heat and pressure to the whole to thermally set the upper and lower blanks and the binder in said resistor composition.

9. In a resistance device, a molded base, a molded resistor element secured to said base with the lower side of said resistor element in contact therewith, and a one-piece metallic terminal embedded in said base and emerging therefrom to form means to which electrical connection may be made on the exterior of said base, the internal end portion only of said terminal being in contact with the lower side of said resistor element.

10. In a resistor of the molded type, a supporting base of molded insulating material, a cellular matrix of molded insulating material continuous with the material of said base disposed in the form of an extended layer having an upper exposed contact face, conductor particles lodged within the cells of said cellular matrix to form therewith a resistor layer, an elongated stationary conducting tap having a bent stem embedded within said insulating base and disposed therein with the end of said stem in electrical engagement with the lower side of said resistor layer, said bent stem being completely surrounded by and in locking engagement with the insulating material of said insulating base.

11. In a resistor of the molded type, a supporting base of molded insulating material, a cellular matrix of molded insulating material continuous with the material of said base disposed in the form of an extended layer having a thermal exit face, conductor particles lodged within the cells of said cellular matrix to form therewith a resistor layer, an elongated stationary conducting tap having a stem provided with noncoplanar surfaces embedded within said insulating base and disposed therein with the end of said stem in electrical engagement with the side of said resistor layer opposite said exit face, said stem being completely surrounded by and in locking engagement with the insulating material of said insulating base.

12. The method of forming a resistance element including a supporting insulating base and a terminal, which consists in placing the rear of a layer of resistor composition containing partially condensed thermal setting binder in facing relationship to a partially condensed weakly solid base-blank of thermal setting insulating material which has an opening therein communicating with said resistor layer, positioning the stem of a terminal in said opening with the end of said stem in close proximity to the rear of said resistor layer, and then applying heat and pressure simultaneously to said resistor layer, base-blank and terminal to condense said resistor binder and base material and to embed the stem of said terminal in said base material with the end of said stem in electrical engagement with the rear of said resistor layer.

13. The method of forming a resistance element including a supporting insulating base and a terminal, which consists in placing the rear of a layer of resistor composition containing partially condensed thermal setting binder in facing relationship to a partially condensed weakly solid base-blank of thermal setting insulating material which has an opening therein in communication with said resistor layer, positioning the stem of a bent terminal in said opening with the end of said stem in close proximity to the rear of said resistor layer and with the remaining bent portion of said terminal in roughly parallel relationship to said resistor layer, and then applying a thermal setting insulating material to the rear of the bent portion of said terminal and while so doing applying heat and pressure simultaneously to said resistor layer, base-blank, insulating material and terminal to condense the same and to embed the stem of said terminal in said base material with the rear of said resistor layer in electrical engagement with the end of said stem.

14. The method of forming a resistance element including an insulating support and terminal, which consists in placing a body of thermal setting plastic resistor composition in contact with a blank of thermal setting plastic insulating material which has an opening therein in communication with said resistor body, inserting the end of a terminal in said opening in a position in close proximity to said resistor body, then applying pressure to said resistor body, insulating blank and terminal to cause said plastic materials to flow toward said terminal to form support for said terminal with said terminal in engagement with said resistor body, and then applying heat to set said resistor body and insulating support.

15. The method of forming a resistance element including an insulating support and terminal, which consists in placing a body of plastic resistor composition in contact with a blank of plastic insulating material which has an opening therein in communication with said resistor body, inserting the end of a terminal in said opening in a position in close proximity to said resistor body, and then applying pressure to said resistor body, insulating blank and terminal to cause said plastic materials to flow toward said terminal to form support for said terminal with said terminal in engagement with said resistor body.

16. The method of forming a resistance element including an insulating support and terminal which consists in placing a body of plastic resistor composition in contact with a blank of plastic insulating material which has an opening therein through which said resistor body is exposed, placing the end of a terminal against the portion of said resistor body which is exposed through said opening, and then applying pressure to said resistor body, insulating blank, and terminal to cause said plastic resistor composition to flow against and around said terminal to secure said terminal in engagement with said resistor body.

BERNHARD F. TELLKAMP.